United States Patent
Lomet

(10) Patent No.: US 7,720,820 B2
(45) Date of Patent: May 18, 2010

(54) LOGLESS PERSISTENT COMPONENTS FOR ENTERPRISE APPLICATIONS

(75) Inventor: David B. Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 11/179,836

(22) Filed: Jul. 12, 2005

(65) Prior Publication Data

US 2007/0016617 A1    Jan. 18, 2007

(51) Int. Cl.
G06F 12/00    (2006.01)
G06F 17/30    (2006.01)
(52) U.S. Cl. .............................. 707/682; 707/E17.007
(58) Field of Classification Search ............... 707/1
See application file for complete search history.

(56) References Cited

U.S. PATENT DOCUMENTS

| | | | | |
|---|---|---|---|---|
| 4,868,744 | A * | 9/1989 | Reinsch et al. | 714/19 |
| 5,337,412 | A * | 8/1994 | Baker et al. | 719/324 |
| 6,366,561 | B1 * | 4/2002 | Bender | 370/238 |
| 6,772,363 | B2 * | 8/2004 | Pedone et al. | 714/4 |
| 2002/0091722 | A1 * | 7/2002 | Gupta et al. | 707/204 |
| 2006/0004536 | A1 * | 1/2006 | Diamond et al. | 702/123 |

OTHER PUBLICATIONS

U.S. Appl. No. 11/232,397, filed Sep. 21, 2005, David B. Lomet.

D. Lomet, "Robust Web Services via Interaction Contracts", TES'04 Workshop, 2004, (to appear) 15 pages.
R. Barga, et al. "Recovery Guarantees for Internet Applications", ACM Transactions on Internet Technology, Aug. 2004, 289-328.
R. Barga, et al. "Improving Logging and Recovery Performance in Phoenix", App. ICDE Conference, Boston, MA, Mar. 2004, 486-497.
R. Barga, et al. "Persistent Applications Via Automatic Recovery", IDEAS Conference, Hong Kong, Jul. 2003, 258-267.
G. Shegalov, et al. "EOS: Exactly-Once E-Service Middleware", Proceedings of the 28th VLDB Conference, Hong Kong, China, Aug. 2002, 1043-1046.
R. Barga, et al. "Phoenix Project: Fault-Tolerant Applications", SIGMOND Record vol. 31, No. 2, Jun. 2002, 94-100.
R. Barga, et al. "Recovery Guarantees for Multi-tier Applications", Proceedings of the ICDE Conference, San Jose, CA, Mar. 2002, 543-554.
D.B. Lomet, et al. "Efficient Transparent Application Recovery in Client-Server Information Systems", ACM SIGMOD Conference, Seattle, WA, Jun. 1998, 460-471.

(Continued)

Primary Examiner—Kuen S Lu
Assistant Examiner—Rachel J Lee
(74) Attorney, Agent, or Firm—Lee & Hayes, PLLC

(57) ABSTRACT

Systems and methods that create persistence for an execution state via employing a logless component with persistent stateful functionality. The logless component is introduced as part of a runtime service that supplies transparent state persistence and automatic recovery for component based applications. Such logless component can avoid logging at a middle tier, and exploit logging that is already performed at a client side and/or various end point servers. The execution state can be re-created entirely via replay of the component execution, without the need to replicate the execution state or save the component's interactions in the middle tier.

17 Claims, 9 Drawing Sheets

OTHER PUBLICATIONS

S. Frolund, et al. "A Pragmatic Implementation of e-Transactions", 19th IEEE Symposium on Reliable Distributed Systems, 2000, 186-195.

S. Frolund, et al. "e-Transactions: End-to-end Reliability for Three-tier Architectures", IEEE Transactions on Software Engineering, vol. 28m No. 4, Apr. 2002, 378-395.

S. Frolund, et al. "Exactly-Once Transactions.", HP Lab Tech Report HPL-1999-105, Sep. 22, 1999, 27 pages.

S. Frolund, et al. "Implementing E-transactions with Asynchronous Replication", IEEE Trans. on Parallel and Distributed Systems, vol. 12, No. 2, Feb. 2001.

A. Borg, et al. "Fault Tolerance Under UNIX", ACM TOCS, vol. 7, No. 1, Feb. 1989, pp. 1-24.

P. Bernstein, et al. "Implementing Recoverable Requests Using Queues", SIGMOD 1990.

P. A. Bernstein, et al. "Principles of Transaction Processing", Morgan Kaufmann, 1996.

E.N. Elnozahy, et al. "A Survey of Rollback-Recovery Protocols in Message-Passing Systems", ACM Computing Surveys, vol. 34, No. 3, Sep. 2002, pp. 375-408.

D. Lomet, "Persistent Middle Tier Components Without Logging", IDEAS Conference, Montreal, Canada, Jul. 2005, 10 pages.

J. Gray, et al. "Transaction Processing: Concepts and Techniques", Morgan Kaufmann, 1993.

\* cited by examiner

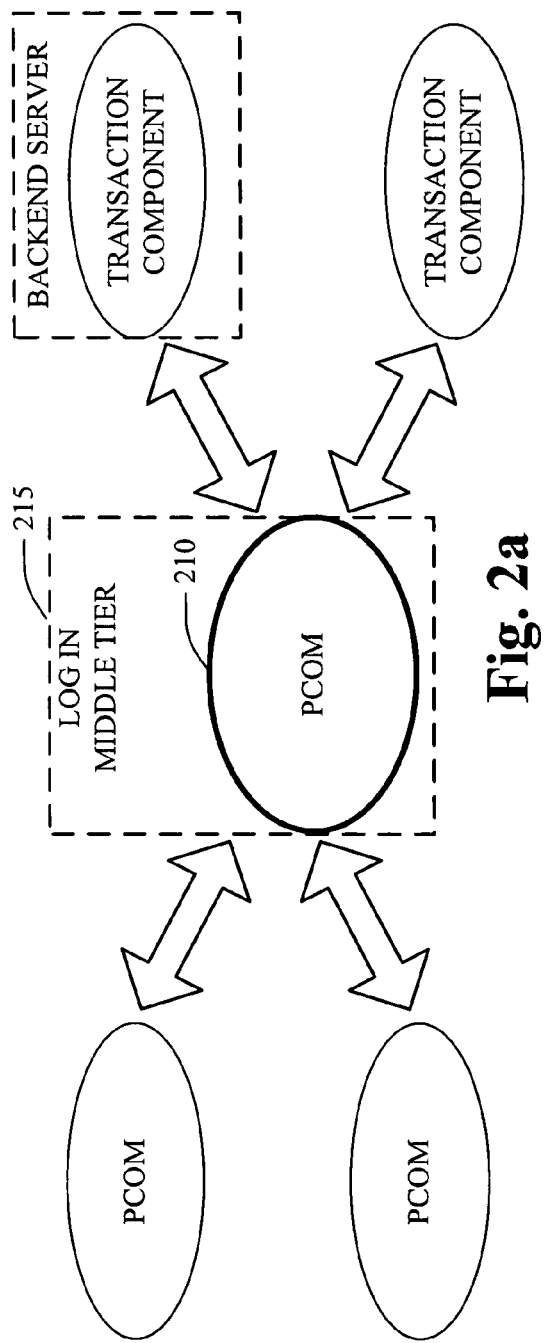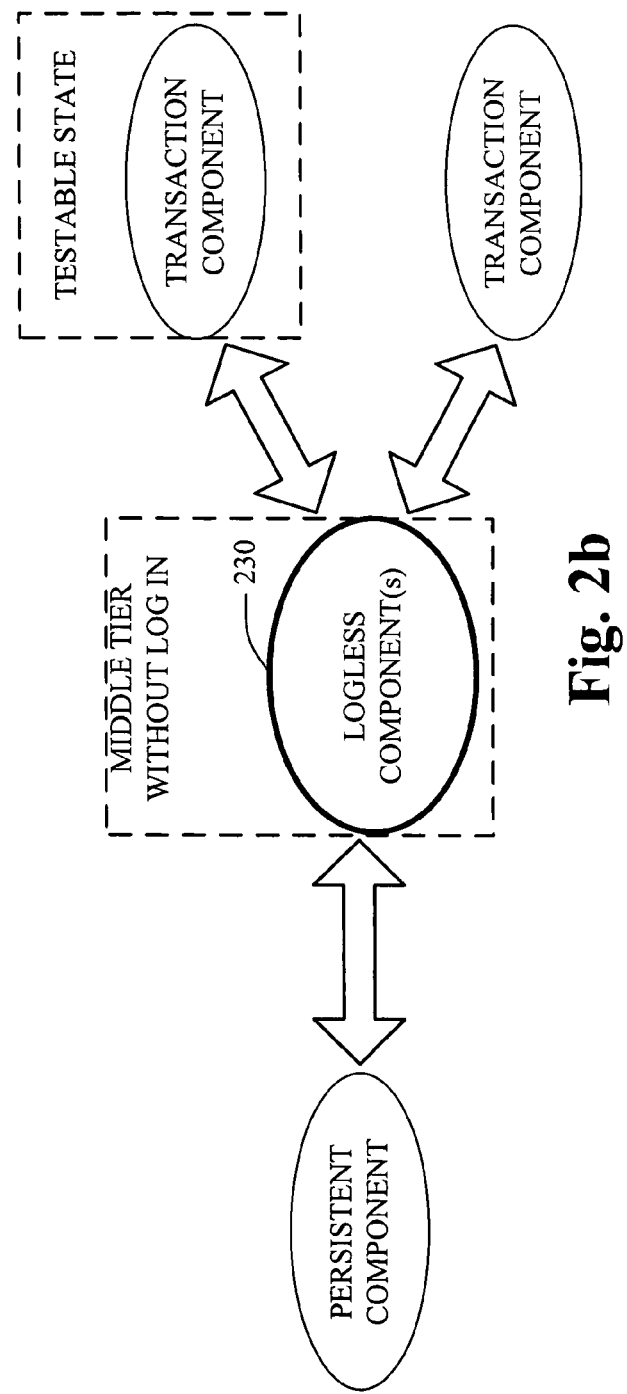

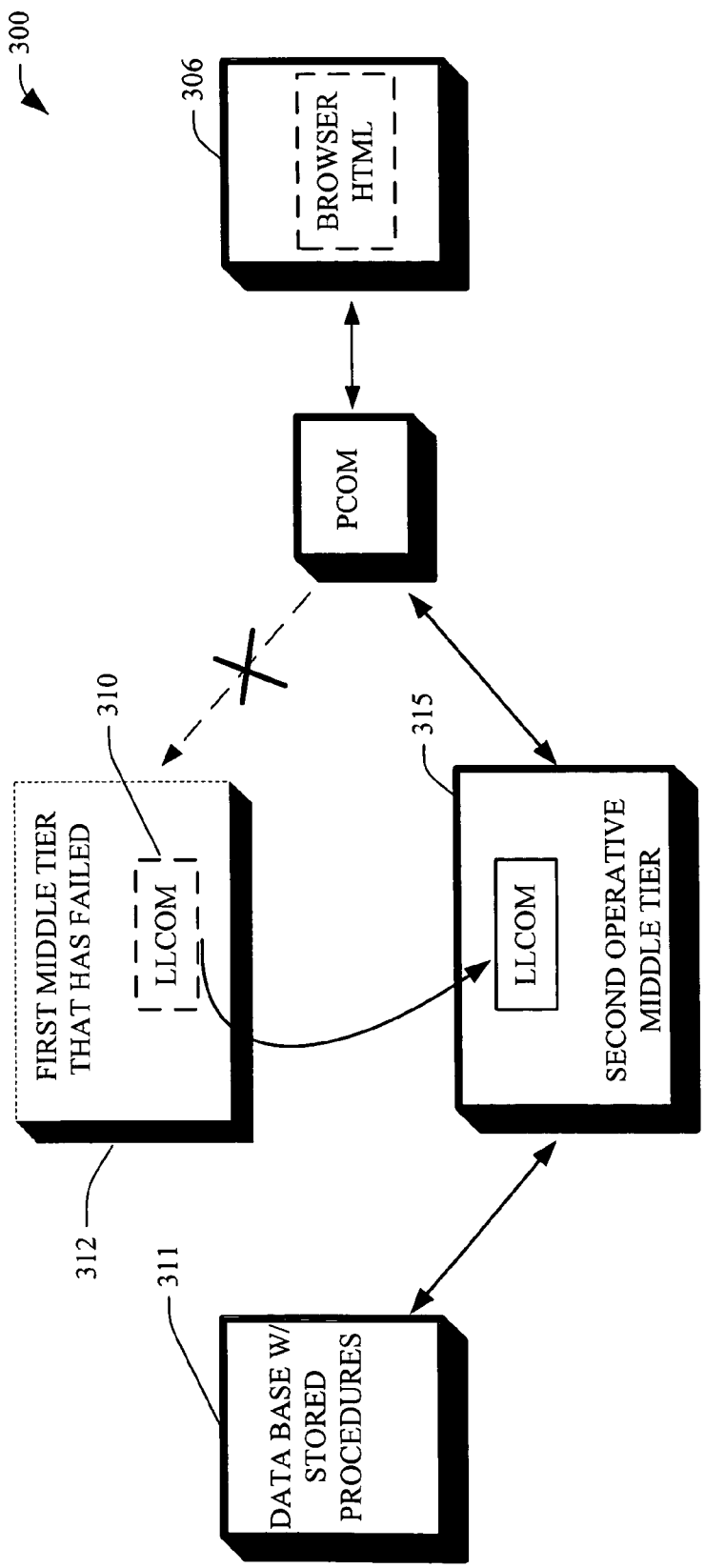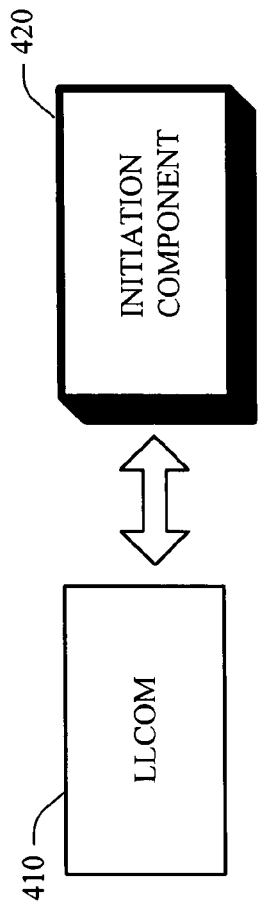
Fig. 3
Fig. 4

LOGLESS PERSISTENT COMPONENTS FOR ENTERPRISE APPLICATIONS

BACKGROUND

The evolution of computers and networking technologies from high-cost, low-performance data processing systems to low-cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet via wire or wireless technology, can provide a user with a channel for nearly instantaneous access to a wealth of information from a repository of web sites and servers located around the world, at the user's fingertips.

Typically for such systems, application developers, unless instructed otherwise, tend to write stateful applications that retain information necessary for correct and successful execution across interaction and transaction boundaries. Such stateful applications risk losing state when the system on which they execute crash. For example, such a crash can create a "semantic mess" that may require human intervention to repair or restart the application, resulting in long service outages. The classic response has been to insist that an application be "stateless", where stateless means "no meaningful information is retained across transactions". Nonetheless, such stateless applications force a rather unnatural form of workflow programming. Often for a stateless application step within a transaction, the application step should first read its state from a transactional queue, execute its logic, and then commit the step by writing its state back to a queue for the next step. Such a programming model also has a potential performance problem due to the need for two phase commit.

Likewise, middle tier applications commonly employ stateless applications. In general, an enterprise middle tier application is typically made up of one or more server components that implement business logic and expose a set of interfaces. A handful of the components in the application may access persistent data, typically stored in a relational database. Also, many components perform a specific task (calculation, data formatting, and the like) on behalf of server components, possibly modifying data and returning a result, yet they retain no state. In addition, there are a small number of critical components that maintain state for the application during the session.

A classic example for a middle tier application is a middle tier e-commerce system for shopping and price comparison. In general, a client session begins when a customer logs in, and customer information is read from a database into a component. As the customer shops, purchases are recorded in the stateful component representing the market basket. When the customer checks out, items in the basket are written to databases (e.g., orders and billing) and the customer database is updated to reflect recent activity.

If a failure occurs during the session, all volatile state can be lost and the session must typically be restarted. Such can result in lost revenues and frustrated customers. Also, depending on the application and point of failure, updates may have to be manually backed out to restore consistency to the system. To avoid this, middle tier systems have typically been designed as stateless applications. Yet, the unnatural programming style associated with stateless applications increases development costs and may reduce system throughput.

At the same time, enterprise applications need to be highly available and scalable. In the past, this has required "stateless" applications, which essentially require the application to manage its state explicitly by storing it in transactional resource managers. Despite "stateful" applications being more natural and hence easier to write with less error, having the system manage this state automatically has been considered too difficult and too costly.

Accordingly, a system builder is faced with a dilemma and has to choose between either: fast and easy development (resulting in applications that are more likely to be correct applications, implemented in a natural stateful programming style, but which fail to provide availability and scalability), or the high availability and scalability of the stateless programming model (which adds to development time and where correctness is more difficult to achieve because of the intrusion of additional concerns of explicit state management.)

Therefore, there is a need to overcome the aforementioned exemplary deficiencies associated with conventional systems and devices.

SUMMARY

The following presents a simplified summary of the innovation in order to provide a basic understanding of some aspects thereof. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The subject innovation provides for systems and methods that create persistence for an execution state via employing a logless component (LLcom) with persistent stateful functionality. Such logless component(s) (LLcom(s)) can be introduced as part of a runtime service, which supplies transparent state persistence and automatic recovery for component based applications. The logless component can avoid logging at a middle tier, and exploit logging that is already performed at a client side and/or various end point servers. For example, at a client side a persistent component can log interactions with users and/or with the rest of the system. Likewise at end point servers, databases can record various transactions and activities from client requests. Accordingly, persistent components in the middle tier can be specified that do not require logging for their persistence, and states associated therewith can be recreated via replay starting at an initial client request. The execution state can be re-created entirely via replay of the component execution, without the need to replicate the execution state or save the component's interactions in the middle tier.

In a related aspect, such logless components can be readily failed over to other component systems in a middle tier of a multi tier system. In doing so, scalability and availability for the system can be facilitated, for example if a first middle tier component is non-responsive, then a client can reinstantiate the component on another middle tier server of a second computer system. Subsequently, the application state in the persistent components can be re-created on the new system, as the requests that have arisen are already captured at the client. Put differently, in order to move such logless components, there is typically no requirement to move a log since the logless component is not required to log its interactions. As such, in general, little or no work is required to move such logless components.

According to a further aspect, idempotent interactions are associated with the logless component of the subject innovation, wherein upon its invocation of a back end application/ program, such backend program guarantees that state information will be modified only on the initial execution, not on subsequent re-executions, and will return the same results each time they are performed. For example in case of a system failure, a client having a browser can read its log to continue with the recovery of the logless component by re-supplying the middle tier with the original input, while the idempotent back end applications return their same results as before the system crash.

According to another aspect, the logless component can further associate with an initiation component, wherein from contents of a creation message, entire information about identity of the logless component can be derived. Such can provide for re-execution of the creation message, to produce a component that is logically indistinguishable from an earlier incarnation. The initiation component can create the logless component multiple times such that all instances are logically identical. Moreover, during the replay, the initiation component can create the logless component in a different part of the system (e.g. a different application server). It is to be appreciated that the initiation component can initiate more than one logless component, and a logless component can initiate other logless components.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 2a & 2b illustrate exemplary block diagrams for logless components (LLcom(s)), transaction components (Tcom(s)) and persistent component (Pcom(s)) interaction.

FIG. 3 illustrates a logless component(s) readily failed over to other component systems in a middle tier of a multi tier system.

FIG. 4 illustrates an initiation component that facilitates replay for an entire history of the LLcom, wherein the LLcom receives the request and issues the reply.

DETAILED DESCRIPTION

Figure 1:
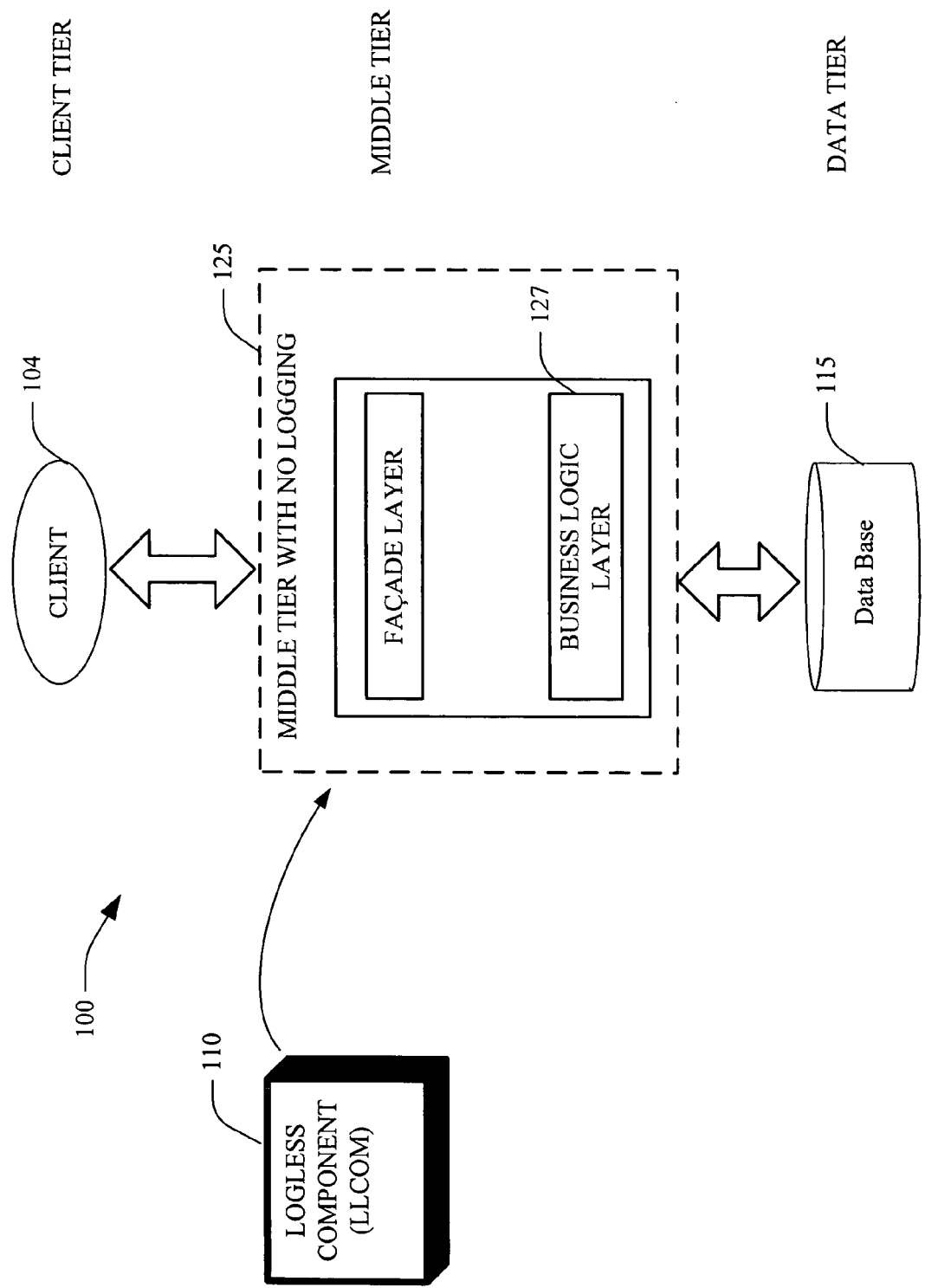
FIG. 1 illustrates a schematic interaction of an enterprise including a client, a middle tier, and a data tier via employing logless components.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation can be practiced without these specific details. In other instances, well-known structures and devices are shown in block diagram form in order to facilitate describing the subject innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

FIG. 1 illustrates a multi-tiered client server architecture 100 with a middle tier 125, which can employ logless components in accordance with an aspect of the subject innovation. A three physical tiered structure, namely; a client tier, a middle tier, and a database tier is provided, wherein the client tier 104 consists of the user workstations, PDAs, and other devices that can host a web browser, for example. For service-oriented solutions, this tier consists of the computers and devices that consume the service. Typically, in such multi-tiered arrangement 100, the client application process represents an application program running on a computer platform, wherein the computer platform can be the same as the server of the database, or it can be a remote computer platform connected to the server via some type of communication medium, such as a communication network.

The middle tier 125 can generally be responsible for hosting the application's business components and, in the case of Web applications, the Web servers as well. Such middle tier 125 can include a business logic layer 127 that performs operations on data passed back and forth through it, and between the data tier 115 and the client tier 104. The layer 127 primarily concerns the logic rather than the view of data or storage of the data. Such an arrangement typically supports scalability and fault tolerance, wherein the application tier can be configured as a server farm and the database tier as a server cluster.

The client tier 104 can interact with the relational database 115 by requesting web pages with or without various parameters. Accessing those web pages in turn invokes business logic layer 127 in the middle tier. Such business logic layer 127 can then invoke data access layer components that in turn issue SQL statements, wherein the SQL statements are communicated to the relational database 115, for example. As such, the client 104 can indirectly issue a procedure call that can instruct the relational database 115 to execute one of the external predefined procedures. In the relational database 115, most of the data is commonly stored as rows in one or more tables. The database 115 can be accessed by one or a plurality of entities having the ability to perform associative queries over tables. Sets of entities stored in tables can be accessed using a set processing language (e.g., structured query language), wherein the language specifies one or more tables as the source of the data and outputs only those row(s), if any, that satisfy a given condition. Components can be considered as: a persistent component (Pcom) that can represent applications associated with the middle tier, transactional component (Tcom) that represent modeling resource managers such as database servers and transactional queues, and in accordance with an aspect of the subject innovation logless components 110 (LLcom), with persistent stateful functionality.

Such LLcom 110 can be introduced as part of a runtime service, which supplies transparent state persistence and automatic recovery for component based applications. The LLcom 110 can avoid logging at a middle tier 125, and exploit logging that is already performed at a client side 104 and/or various end point servers. For example, at a client side 104 a persistent component (Pcom) can log interactions with users and/or with the rest of the system. Likewise at end point servers, databases can record various transactions and activities from client requests. Accordingly, persistent component (Pcom) in the middle tier 125 can be specified so that it does not require logging for its persistence, and a state associated therewith can be recreated via replay starting at a client request.

As such, components declared as persistent (Pcom(s)) survive system crashes. Components declared as transactional (Tcom(s)) typically should have testable transaction state, as in transaction processing and e-transactions. A system including Pcom(s) and Tcom(s) is shown in FIG. 2a.

Pcom(s) 210 can serve multiple calls from multiple clients, send messages to other Pcom(s) or Tcom(s) and the like, while providing exactly-once semantics. Moreover, multiple clients can have multiple message interactions with a mid-tier Pcom 215 that does logging. Such mid-tier Pcom 210 can interact with multiple backend servers in multiple transactions. For such components to persist across system crashes, logs of the interactions can be created so that the Pcom 210 can be deterministically replayed using the log to capture nondeterministic events and their potentially nondeterministic arrival order. A Pcom log can also permit it to recover independently of other components. Such logging can permit it to satisfy the requirements of "interaction contracts", which can require components to guarantee that their state and messages will survive system crashes and provide exactly once executions. It is this logging that permits a Pcom 210 to engage in relatively unconstrained activity, with other Pcom(s) and Tcom(s) while maintaining persistence across crashes.

Likewise, the LLcom(s) 230 in FIG. 2b avoids logging while providing a persistent, stateful model of components. As explained earlier, such a component can exploit the logging done already by other components. In addition, such logless components can be called multiple times, and interact with a number of backend systems involving a number of transactions, while retaining persistent state. Accordingly, they can support a natural stateful programming model in which the application programmer can focus on application logic, rather than system issues.

The LLcom(s) 230 can be easily re-deployed across an enterprise system since there is no log that needs to be shipped to enable the re-deployment. In addition to their clear advantages for availability and scalability, the LLcoms 230 have an important performance advantage during normal execution. Because no logging is required of them, they save the execution path for storing information in the log buffer, and the delays associated with log forces. Moreover, the LLcoms 230 will typically not require more logging or more log forces from the components with which they interact. For these components, the LLcom can be treated as if it were a Pcom, though these other components may be required to keep persistent messages for a longer period. They can, at their option, choose to force their logs somewhat more often to provide for faster recovery.

FIG. 2b illustrates a schematic diagram for the LLcom(s) interaction in the form of a request/reply. Such can typically ensure that requesters await replies, and failure of the LLcom reply to arrive in a timely fashion can trigger the LLcom recovery, as described in detail infra. The LLcom requestor failure does not trigger repeated retransmissions of the reply, and the reply can be held until the recovered the LLcom re-requests it.

In general, restricting the LLcom(s) to request/reply interactions can leave these components with great flexibility. For example, the LLcom can have a state that can live across multiple interactions that it makes with other (backend) components, when the LLcom is the requestor for the interaction. Further, such LLcom is capable of living across multiple transactions, e.g. that it is involved with via request/reply interactions with Tcom's. Additionally, such LLcom can engage in a request/reply "conversation" with its initiating Pcom or other LLcom. While the LLcom(s) have restrictions on their deployment when compared with Pcom(s), they can still retain a large degree of flexibility.

Many multi-tier systems can typically be amenable to support by the LLcom(s) of the subject innovation. It is to be appreciated that the LLcom(s) are not restricted to the three tier systems or the single transaction execution of the e-transaction model, and there can exist multiple layers of the LLcom(s) between front end client, e.g., realized as a Pcom(s), and backend databases, realized as Tcom(s). As illustrated in FIG. 2b, the Pcom initiator of the first of a layer(s) of the LLcom can log the LLcom reply which effectively summarizes the impact of all the LLcom's calls and activity into the one message. Such message, when logged, permits this Pcom to be replayed from the log. Should the LLcom call not return, then it can be replayed in an idempotent way, as described in detail infra. Hence recovery for the initiator Pcom is provided, without the LLcom(s) performing logging. The LLcom of the subject innovation can also act as a Pcom in interaction with a web service(s), without a requirement for a middle tier logging. A Pcom client can log interactions which it may make to one or more the LLcom in the middle tier. Such LLcom(s) can then interact with web services using the web service interaction contract (WSIC). The web service can provide testable state. In general, the logging at client Pcom and at the web services is sufficient for exactly once execution.

The LLcom of the subject innovation can provide for various advantages. For example, and as illustrated in FIG. 3, the LLcom(s) 310 can be readily failed over to other component systems in a middle tier 315 of an operating multi tier system. The system 300 can include a database 311, a first middle tier 312 with a data access layer that has failed provide communication with the database 311. The middle tier 312 backs a web application that implements web services and server side web user interface components. Upon failure of the first middle tier 312, a user can then employ the second middle tier 315 via a web browser 306 to browse web pages served by a web server that can call upon business logic components in the middle tier 315, which in turn can invoke components in an associated data access layer, to summon the stored procedures in the database 311.

In doing so, scalability and availability for the system 300 can be facilitated, since when first middle tier 312 has failed or is non-responsive, then the client can simply redirect a request to another middle tier of a second computer system 315, wherein the application state in the persistent components is re-created on the new system as the values that have arisen are already captured at the client. Put differently, in order to move such logless component 310, there is typically no requirement to move a log since the logless component does not require to log its interactions. Accordingly both scalability and availability can be improved.

In a related aspect, the LLcom(s) can be generated by imposing restrictions on Pcom(s). As illustrated in FIG. 4, for an entire history of the LLcom to be replayable without logging, an initiation component 420 can be employed. The LLcom 410 receives a request from the initiation component 420 and issues a reply to it. The initiation component 420 can mitigate nondeterminism resulting from naming and mapping to underlying physical resources, wherein from contents of a creation message, the entire information about identity of the logless component can be derived. Such can provide for re-execution of the creation message, to produce a component that is logically indistinguishable from an earlier incarnation. The initiation component 420 can create the LLcom 410 multiple times such that all instances are logically identical. Moreover, during the replay, the initiation component can create the LLcom 410 in a different part of the system, (e.g. a different application server.) It is to be appreciated that the initiation component 420 can initiate more than one logless component, and a logless component can initiate other logless components.

The initiation component 420 operating as the initiator of a call, can also initiate recovery for the LLcom 410. Unlike Pcom(s), where the infrastructure hosting the Pcom supports a log and a recovery manager that handles recovery for local components, no such log exists for the LLcom(s). Thus, to provide the LLcom recovery, the initiation call can be replayed. For example, detecting a failure can require that the initiation component 420 expect a message from its initiated the LLcom 410, and fail to receive it after some timeout period. In general, the initiation component 420 needs execution control to return to it in some way from every LLcom 410 that it initiates. As explained earlier, the initiation component 420 can send multiple messages to the LLcom 410 that it initiates, and it should reach a state wherein a message is expected from the LLcom. It is the failure of such a message to arrive that triggers the initiation component 420 to begin recovery via replay of the initiating message.

More than one LLcom can be initiated, and the LLcom can initiate other LLcom(s). Yet the initial LLcom in the system should typically be initiated by a Pcom. Such requirements can ensure that the LLcom(s) are recoverable. The Pcom initiating the first LLcom is independently recoverable via logging. Other LLcom(s) can be recoverable either directly by the Pcom or by the LLcom that is recoverable by the Pcom. As such, the originating Pcom makes this "recursion" well founded. Thus, a Pcom can initiate a "tree of the LLcom(s)" for a successful recovery thereof. The LLcom(s) that are inactive for a sufficiently long time can simply be de-allocated as they can be re-instantiated via replay, if they are needed again.

In general, logging need not be forced when a Pcom interacts with the LLcom that it initiates. Furthermore, there is no need to force log subsequent interactions. For example, what exists on the stable log in this case can be useful to optimize Pcom recovery. In general, the LLcom can be restartable from its initiating call, and subsequent replay of its interactions is entirely deterministic. If the LLcom is alive during Pcom replay and only have retained information about its last call from the Pcom, it may need to self-destruct so that its complete replay is possible. Moreover, if the LLcom no longer exists at a middle tier site, the site can respond to the initiating Pcom that the message failed to be delivered because the target does not exist. At this point, the initiating Pcom can recover the LLcom by replaying messages to it, starting at its initiating call. A Pcom should typically be prepared to replay the LLcom from its initiating call forward. Any LLcom checkpoint will need to include the LLcom initiating call, in conjunction with the Pcom messages to the LLcom before the Checkpoint, so that the LLcom can be recovered.

According to a further aspect, idempotent interactions are associated with the LLcom, wherein upon invocation of a back end application/program, state is modified only on the original invocation. Upon any subsequent replay of that call, information is not modified, and the same result is returned each time the call is replayed. For example, in case of a system failure, a client having a browser can perform logging activities to continue with the recovery of the logless component by re-supplying the middle tier with the original input, and the idempotent back end application returns a same result. Typically, components should enforce the requirements for elimination of duplicates, so as to enforce "exactly once" execution semantics, and return on request, the result message that they have promised to maintain about the interaction.

In general, the guarantee provided by a "live" committed interaction contract (CIC) or transaction interaction contract (TIC) ensures that the interaction is idempotent, and it can be re-played multiple times while only producing a state change exactly once, wherein the same result message is returned. As explained, it is idempotence that describes this "reliable" interaction replay. Accordingly, the LLcom(s) typically do not interact with or read external (and hence non-deterministic) system state or affect external state outside of Tcom or Pcom interactions. For example, "external" reads, which are possible with Pcom(s), cannot be permitted for the LLcom(s), as there is no guarantee that replaying the interaction will produce the same result—even though a read does not change state.

Figure 5:
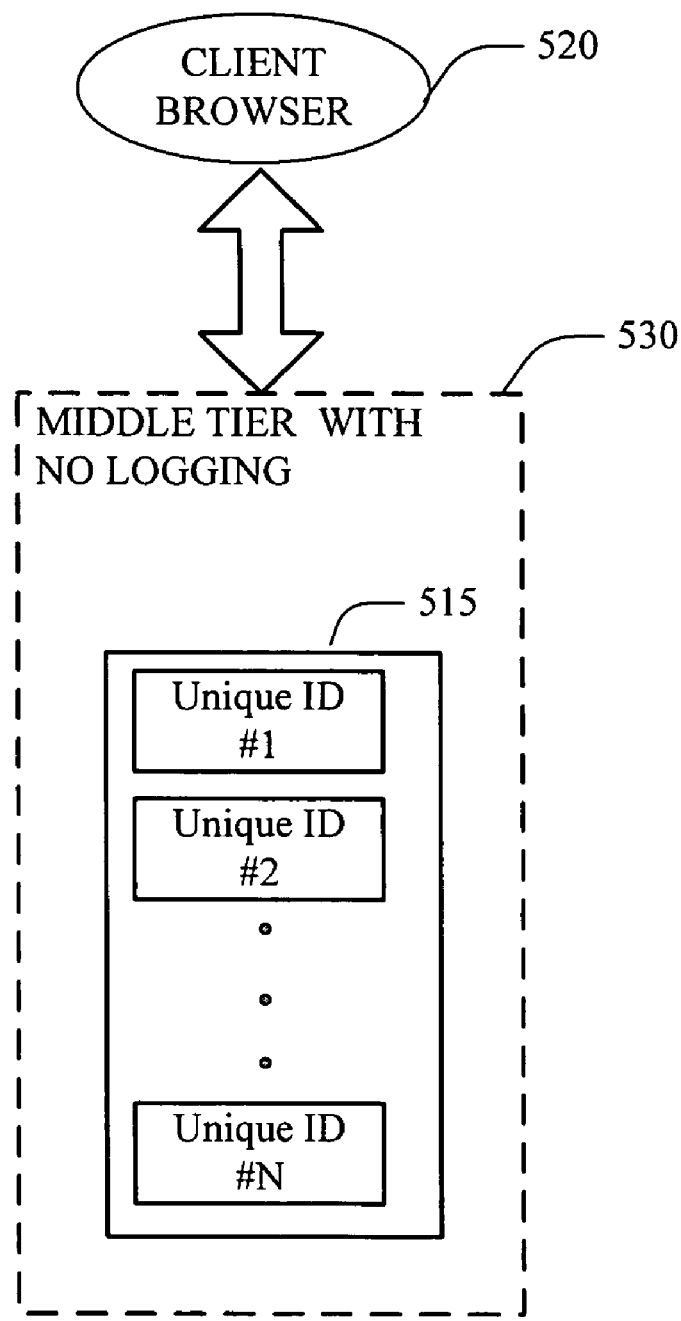
FIG. 5 illustrates a deterministic interaction order associated with the logless component via deterministic unique identification(s) (ID)s, which can designate request IDs for the idempotent interactions with a backend server.

FIG. 5 illustrates a related aspect, wherein a deterministic interaction order associated with the logless component can be provided via a deterministic unique identification (ID) 515 (1 to N, where N is an integer) that serves to identify the component. Within the uniquely identified component 515, its state is represented by a sequence of unique identifiers, one for each idempotent interaction, wherein the state of a logless component can be completely determined by its own ID and the IDs for its idempotent interactions. Accordingly, when a client browser 520, which hosts a Pcom, interacts with a middle tier 530, it remembers its initiation call. The middle tier 530 recreates the unique ID for the component 515 as a result of the call. During component 515 replay, the same IDs for each idempotent interaction with backend servers are produced, and these are employed to generate a same answer in case of a system crash and further recovery of the logless component. Typically, an entire history of the LLcom can be replayable without logging. The LLcom can deterministically identify a next interaction (e.g., send or receive) and which component the interaction is with. For example, when the LLcom represents the execution of a single request, e.g. the execution of a single method, wherein such method can call out to other components via employing idempotent interactions, and if it is single threaded, the order of execution is completely determined by the code that it executes and the results of the idempotent interactions encountered during execution. In doing so, each ID can represent an idempotent interaction. If the interaction is a message send, then such condition is satisfied as it is the component's deterministic execution that leads to the message send.

For a receive of a reply message that is part of a request/reply setting, it is evident that the reply (a message receive) is from the recipient of the request message, and the reply message is awaited at a deterministic point in the component execution. For other receives, more care is required. But nonetheless, it is possible for the LLcom 515 to receive a series of requests from a given client component in a "conversation" scenario. As such, it is known that the initial client would be the next sender of a request message that is expected. Thus, during replay, when execution reaches the state where the request message is due, recovery can ask for the request message from the client.

As explained earlier, whenever the LLcom crashes or is de-allocated to free up resources, and enable scalability or other system management goals, typically it can be re-created only via complete replay of its entire execution history, starting from its initiation message. In doing so, it can be desirable to perform such replay quickly to achieve high availability and minimize system overhead, and to maintain a short lifetime for the LLcom. The LLcom relies upon other components for logging its interactions. Accordingly, the replay time can be governed by: the LLcom execution time, and the time required for other components to respond to its replayed interactions. Such response time by other components is commonly much shorter than the original execution time, since other components will usually not need to re-execute requests during replay—(rather, they will normally simply look up the messages sent to them by the LLcom and generate replies based on information that they have retained in a table.) Hence, lifetime of the LLcom will commonly be a function of its execution path plus the number of interactions times the replay time for each interaction, and not the original time required to execute a code to reproduce the result of the original interaction. As such, maintaining a short lifetime for the LLcom, while important, is a pragmatic consideration. It is to be appreciated that the long lived LLcom(s) can still function properly, subject to the other considerations addressed herein. It is the associated practical value that diminishes as their lifetime increases.

In a related aspect, a system that implements the LLcom(s) can be enabled to determine lifetime in a syntactic manner prior to deploying the components in a live system. For example, loops can be precluded and/or a limit imposed on the number of calls that the LLcom can make or can receive. Accordingly, the execution path of the LLcom and the number of interactions in its lifetime can be determined. It is to be appreciated that a stateless form can be reached at the end of the LLcom's lifetime. At that point, there is no state that needs to persist. For example, if the LLcom's lifetime is bracketed by a method call/return, then once its caller logs the return message, there is no longer any state that needs to be recovered. Put differently, replay of the LLcom is typically no longer necessary, and the LLcom can be deallocated.

Figure 6:
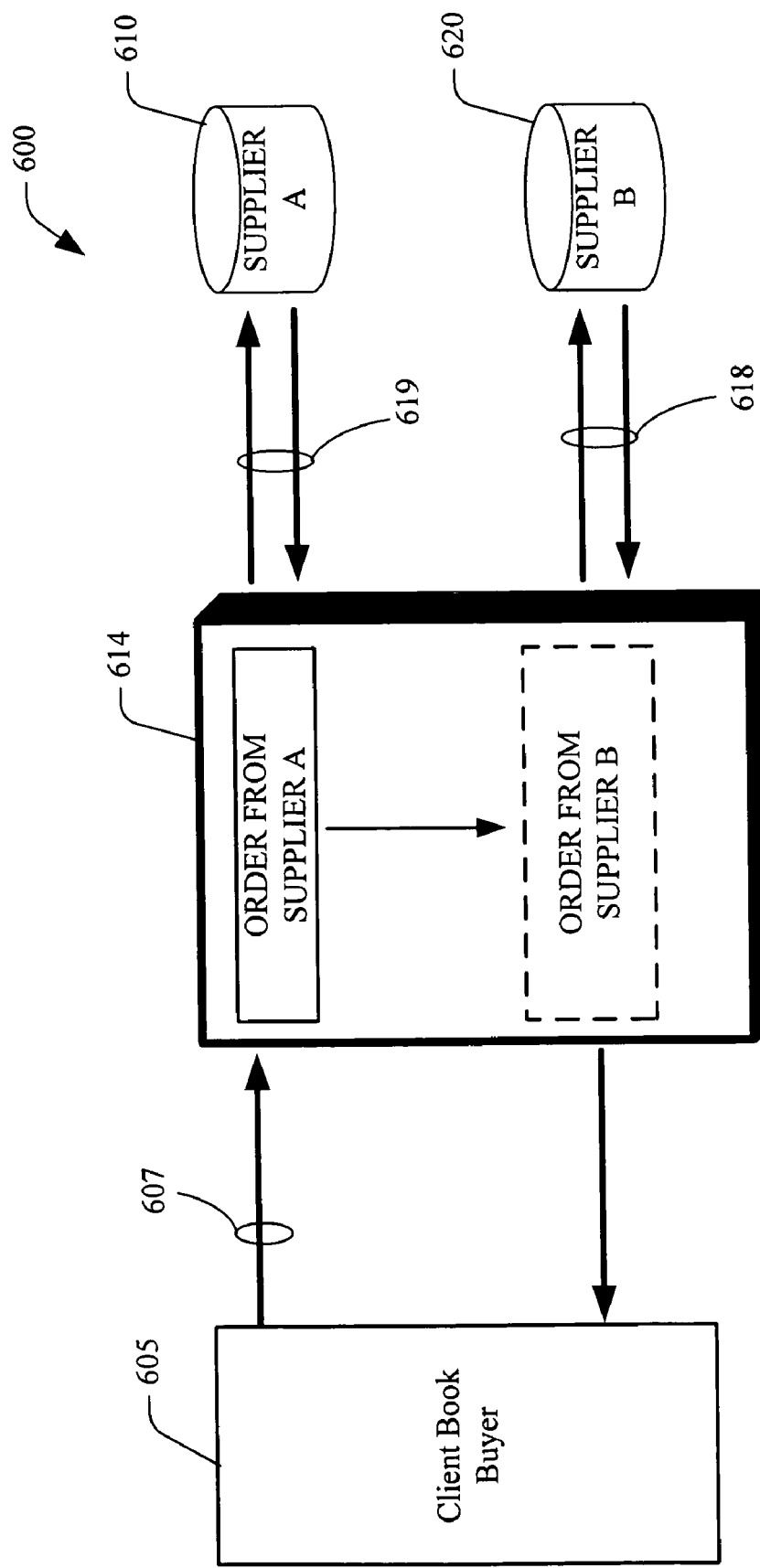
FIG. 6 illustrates a particular application of the subject innovation, which can be supported by logless components implemented as part of a book buyer application.

FIG. 6 illustrates a particular application, which can be supported by logless components implemented as part of a book buyer application. According to one exemplary aspect of the subject innovation, the application of FIG. 6 is described in context of ordering textbooks from wholesalers. The client book buyer 605 has a preference to use Supplier A 610 as the supplier for textbooks, and it is Supplier A 610, which is first asked to satisfy an order. Supplier B 620 is employed, only if Supplier A 610 cannot satisfy a placed order. As illustrated the client book buyer 605 requires an order 607 of 50 books, and the book buyer application 600 initially requests such number of textbooks from Supplier A 610. Supplier A 610 only has thirty five of the books in stock and returns to the book buyer confirming an order 619 for thirty five counts of the books. Subsequently, the book buyer proceeds to order the remaining fifteen books from Supplier B 620, at 618. As such, the book buyer application is a stateful application. For example, the fact that Supplier A 610 supplied thirty five of the books is a state that needs to be carried over for a correct interaction with Supplier B.

The application 600 can be realized as a logless component. The book buyer client 605, requesting fifty counts of books, needs to make that request persistent, either by logging it explicitly, or by logging the user input so that replay can re-generate the request. Each supplier needs to present an idempotent interface, where repeating the exact order will yield the same result. Thus, all non-determinism has been captured at either the client (who captures the request) or the back end suppliers (who capture the order that was submitted and provide idempotence). Hence the middle tier application 614 does not require any logging in order to ensure persistence across system failures.

If the system crashes (or merely times out because of slow servers or network), the client book buyer 605 can re-submit the request anywhere in the system, without concern about log shipping (to send the state) or concerns about double ordering at the suppliers. Any duplicate request to a back end supplier is typically guaranteed, because of idempotence, to not trigger multiple executions, and further to return the exact same result as the original request. It is to be appreciated that two book buyer components 614 can be active simultaneously. The client book buyer 605 can distinguish them and their reply messages and because the client is a Pcom, it will eliminate the duplicate replies. In general, a single order placed at a supplier, regardless of how many times it is replayed, always orders the same number of books, and its effect is as if it executed exactly once.

Figure 7:
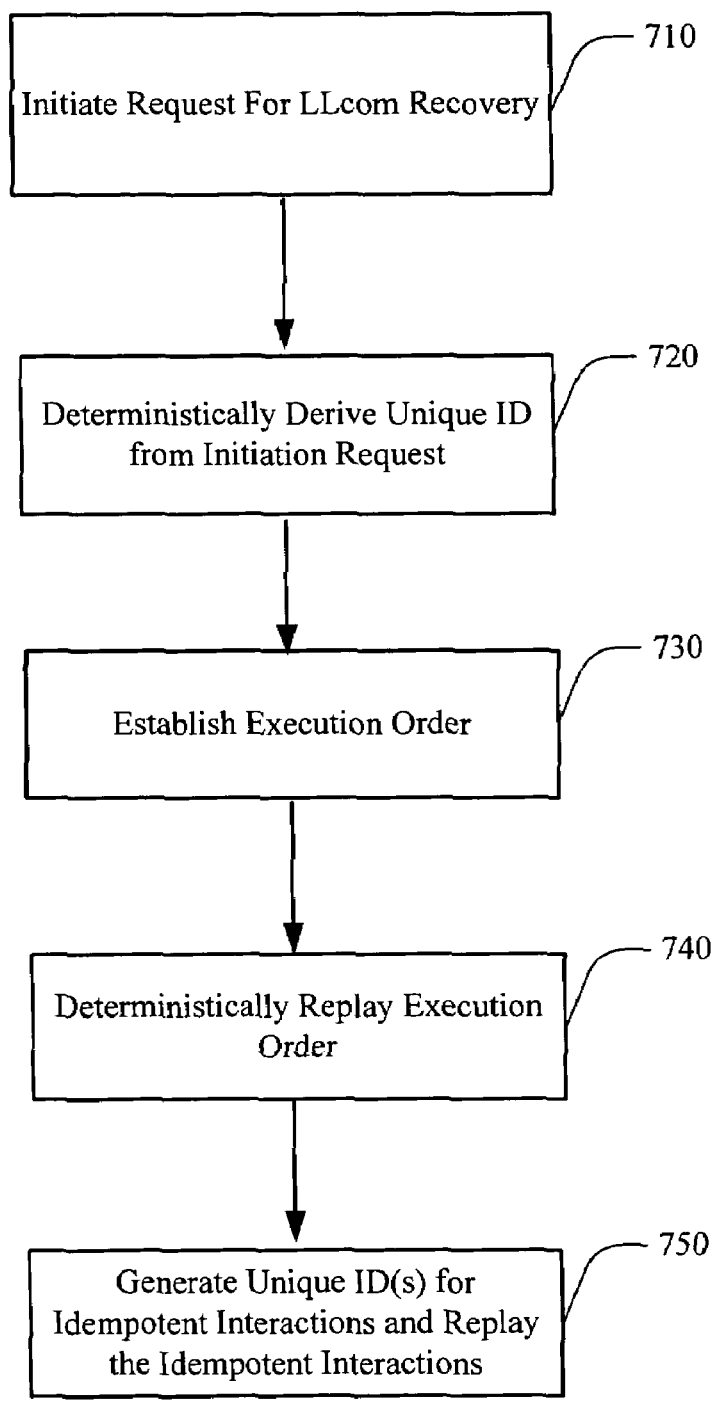
FIG. 7 illustrates a number of acts associated with employing a logless component.

FIG. 7 illustrates a number of acts in accordance with an aspect of the subject innovation. While the exemplary method is illustrated and described herein as a series of blocks representative of various events and/or acts, the present innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially, and at 710 a request for the LLcom recovery is initiated. From such initiation request a unique ID(s) can then be deterministically derived, at 720. Then, during replay, further unique IDs can be generated for each idempotent interaction, such that the state of the logless component can be completely determined by its own ID and the IDs used in its idempotent interactions. Subsequently, and at 730 an execution order can be established. Upon establishing such execution order, then the execution order can be deterministically played at 740. For example, the LLcom execution order can deterministically identify the next interaction as to the kind of interaction (send or receive) and with which component the interaction is with. If it is a message send, then such condition is satisfied as it is the component's deterministic execution that leads to the message send. The replay 740 will lead to the generation of unique IDs for the idempotent interactions with the backend servers, at 750. Upon presenting an ID to a backend server, because of idempotence, the backend server will provide the same result as during the original execution. For a receive message that is part of a request/reply setting (i.e., part of an idempotent interaction with a backend server, the reply (a message receive) is from the recipient of the request message, and the reply message is awaited at a deterministic point in the component execution.

Moreover, the LLcom can receive a series of requests from a given client component in a "conversation" scenario. As such, it is known that the initial client would be the next sender of a message that is expected. Thus, during replay, when execution reaches the state where the message is due, a re-request of the message from the client is performed. As such, persistence for an execution state can be created via employing the logless component with persistent stateful functionality. The logless component can avoid logging at a middle tier, and exploit logging that is already performed at a client side and/or various end point servers.

Figure 8:
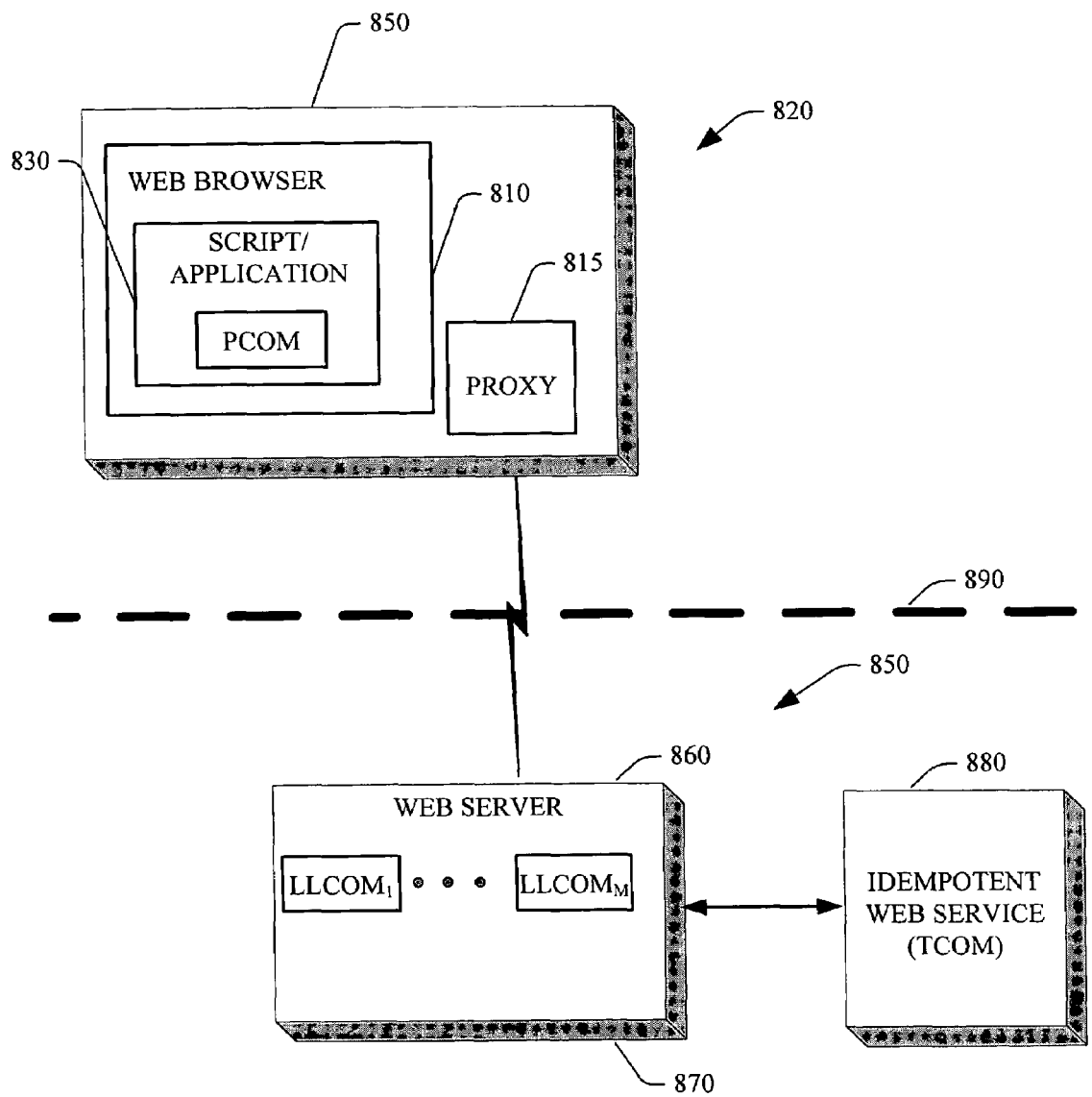
FIG. 8 illustrates a web browser in communication with a web server as part of a multi-tiered structure, wherein a logless component can avoid logging with a middle tier.

Referring now to FIG. 8, there is illustrated a web browser in communication with a web server as part of a multi-tiered structure, wherein a logless component can avoid logging with a middle tier. The client web browser in its script can be logging so that it can be a PCOM. Running on the client 820 is a client process such as a web browser 810 and likewise, running on the server 850 are corresponding server processes, for example, a web server 860. In addition, embedded in the Web Browser 810 can be a script or application 830, and running within the run-time environment 850 of the client computer 820, can exist a proxy 815 for packaging and unpacking data packets formatted in accordance with various aspects of the subject innovation. At the backend an idempotent web service 880 can provide access to a database (not shown). Moreover, each of the LLcoms (1 thru M, where M is an integer) can represent the session state of a different client.

The client computer 820 and the server computer 850 can communicate with each other through a network 890. When the client process, e.g., the Web browser 810, requests data from a database, the script or application 830 issues a query that is sent across the network (e.g. Internet) 890 to the server computer 850, where it then is interpreted by the server process, e.g., the Web server 860. The client's 820 request to server 850 can contain multiple commands. Responses to client commands that are returned can be self-describing, and record oriented; (e.g., the data streams can describe names, types and optional descriptions of rows being returned.)

Figure 9:
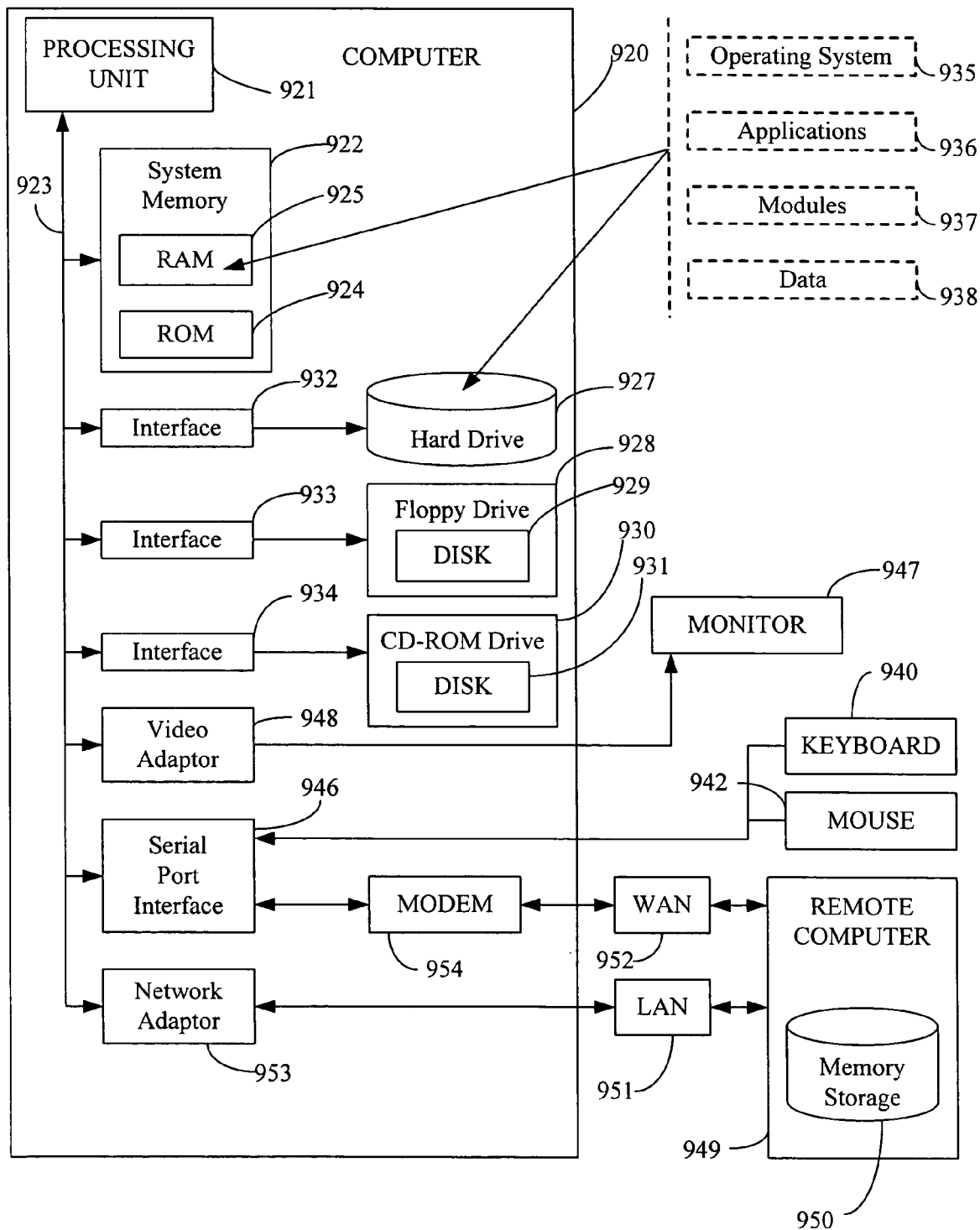
FIG. 9 illustrates a brief, general description of a suitable computing environment, wherein the various aspects of the subject innovation can be implemented.

Referring now to FIG. 9, a brief, general description of a suitable computing environment is illustrated wherein the various aspects of the subject innovation can be implemented. While the innovation has been described above in the general context of computer-executable instructions of a computer program that runs on a computer and/or computers, those skilled in the art will recognize that the innovation can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the innovation can also be practiced in distributed computing environments where tasks are performed by remote processing devices that are linked through a communications network. However, some, if not all aspects of the innovation can be practiced on stand-alone computers. In a distributed computing environment, program modules can be located in both local and remote memory storage devices. The exemplary environment includes a computer 920, including a processing unit 921, a system memory 922, and a system bus 923 that couples various system components including the system memory to the processing unit 921. The processing unit 921 can be any of various commercially available processors. Dual microprocessors and other multi-processor architectures also can be used as the processing unit 921.

The system bus can be any of several types of bus structure including a USB, 1394, a peripheral bus, and a local bus using any of a variety of commercially available bus architectures. The system memory may include read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading from or writing to a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject innovation. A number of program modules can be stored in the drives and RAM 925, including an operating system 935, one or more application programs 936, other program modules 937, and program data 938. The operating system 935 in the illustrated computer can be substantially any commercially available operating system.

A user can enter commands and information into the computer 920 through a keyboard 940 and a pointing device, such as a mouse 942. Other input devices (not shown) can include a microphone, a joystick, a game pad, a satellite dish, a scanner, or the like. These and other input devices are often connected to the processing unit 921 through a serial port interface 946 that is coupled to the system bus, but may be connected by other interfaces, such as a parallel port, a game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 can operate in a networked environment using logical connections to one or more remote computers, such as a remote computer 949. The remote computer 949 may be a workstation, a server computer, a router, a peer device or other common network node, and typically includes many or all of the elements described relative to the computer 920, although only a memory storage device 950 is illustrated in FIG. 9. The logical connections depicted in FIG. 9 may include a local area network (LAN) 951 and a wide area network (WAN) 952. Such networking environments are commonplace in offices, enterprise-wide computer networks, Intranets and the Internet.

When employed in a LAN networking environment, the computer 920 can be connected to the local network 951 through a network interface or adapter 953. When utilized in a WAN networking environment, the computer 920 generally can include a modem 954, and/or is connected to a communications server on the LAN, and/or has other means for establishing communications over the wide area network 952, such as the Internet. The modem 954, which can be internal or external, can be connected to the system bus 923 via the serial port interface 946. In a networked environment, program modules depicted relative to the computer 920, or portions thereof, can be stored in the remote memory storage device. It will be appreciated that the network connections shown are exemplary and other means of establishing a communications link between the computers can be employed.

In accordance with the practices of persons skilled in the art of computer programming, the subject innovation has been described with reference to acts and symbolic representations of operations that are performed by a computer, such as the computer 920, unless otherwise indicated. Such acts and operations are sometimes referred to as being computer-executed. It will be appreciated that the acts and symbolically represented operations include the manipulation by the processing unit 921 of electrical signals representing data bits which causes a resulting transformation or reduction of the electrical signal representation, and the maintenance of data bits at memory locations in the memory system (including the system memory 922, hard drive 927, floppy disks 929, and CD-ROM 931) to thereby reconfigure or otherwise alter the computer system's operation, as well as other processing of signals. The memory locations wherein such data bits are maintained are physical locations that have particular electrical, magnetic, or optical properties corresponding to the data bits.

Figure 10:
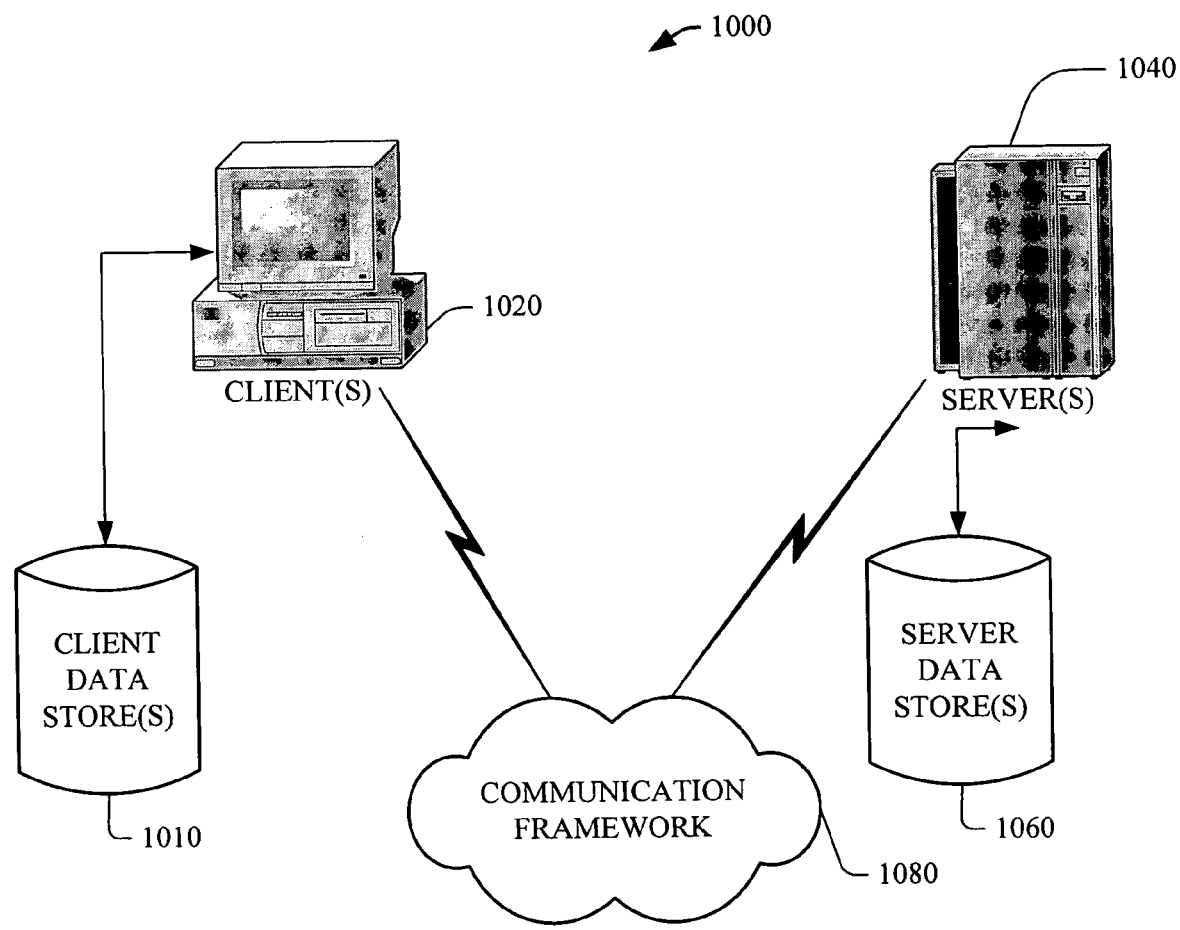
FIG. 10 illustrates a client—server system that can employ a logless component according to one aspect of the subject innovation.

Referring now to FIG. 10, a client—server system 1000 that can employ a logless component according to one aspect of the innovation is illustrated. The client(s) 1020 can be hardware and/or software (e.g., threads, processes, computing devices). The system 1000 also includes one or more server(s) 1040. The server(s) 1040 can also be hardware and/or software (e.g., threads, processes, computing devices). For example, such servers 1040 can house threads to perform transformations by employing the innovation. The client 1020 and the server 1040 can communicate, between two or more computer processes. As illustrated, the system 1000 includes a communication framework 1080 that can facilitate communications between the client(s) 1020 and the server(s) 1040. The client(s) 1020 is operationally connected to one or more client data store(s) 1010 that can store information local to the client(s) 1020. Moreover, client 1020 can access and update databases 1060 located on a server computer 1040 running a server process. In one aspect of the innovation, the communication framework 1080 can be the internet, with the client process being a Web browser and the server process being a Web server. As such, a typical client 1020 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1040 can be university or corporate mainframe computers, or dedicated workstations, and the like.

Although the innovation has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, and the like), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates persistence for an execution state comprising:
   a remote front end client device that is configured to host a web browser and includes a plurality of persistent client components that logs interactions with users of the system;
   a back end device that is configured to store data received from the remote front end client device in a computer-readable storage medium and includes a plurality of transaction components that interact with the remote front end client device; and
   a middle tier device configured to receive and send data between the remote front end client device and the back end device and include a plurality of logless components and a business logic layer that is configured to perform operations on the data passed back and forth between the remote front end client device and the back end device,
   wherein a run-time service, on the remote front end client device, supplies transparent state persistence and automatic recovery for component based applications,
   wherein a first logless component supplies persistent stateful functionality for the run time service, without logging therewith, the first log less component with idempotent interactions that return a same result upon a call invocation for the first logless component at the back end device, upon deallocation of the first logless component, a second logless component starts on a separate device that is logically identical to the first logless component, and
   wherein the logless components are configured to only utilize the logging generated by the persistent client components or the transaction components.

2. The system of claim 1 further comprising a middle tier that does not log activities of the logless components.

3. The system of claim 1, the logless components recoverable via a replay.

4. The system of claim 1, the logless components recoverable without using replication.

5. The system of claim 1 further comprising a unique identification that is deterministically derived from an initiation request.

6. The system of claim 1 further comprising an initiation component that interacts with the logless components about derivation of identity for the log less components.

7. The system of claim 1, wherein the plurality of transactional components represent modeling resource managers for the runtime service.

8. The system of claim 1, a history of the logless components replayable without logging.

9. A method of persisting an execution state comprising:
supplying a persistent stateful functionality and automatic recovery for component based applications via a plurality of logless components without logging thereof with a run time service stored on a computer-readable storage medium on a remote front end client device that is configured to host a web browser, the remote front end client device including a plurality of persistent client components configured to loci interactions with users;
storing data received from the remote front end client device in a computer-readable storage medium on a back end device, the back end device including a plurality of transaction components that interact with the remote front end client device;
receiving and sending data between the remote front end client device and the back end device by a middle tier device, the middle tier device including the plurality of logless components and a business logic layer that is configured to perform operations on the data passed back and forth between the remote front end client device and the back end device,
wherein the logless components are configured to only utilize the logging generated by the persistent client components or the transaction components;
calling out to the logless components associated with the run time service through idempotent interactions and generating a same answer to the call for the logless components via the idempotent interactions; and
upon deallocation of a first logless component, recovering a second logless component on a separate device that is logically identical to the first logless component via a replay or without using replication.

10. The method of claim 9 further comprising deterministically identifying a next interaction of the logless components.

11. The method of claim 9 further comprising initiating the logless components recovery, and deterministically deriving unique ID(s) that represent the idempotent interactions.

12. The method of claim 9 further comprising re-execution of the logless components via a creation message, to produce a logically indistinguishable version from an earlier incarnation.

13. The method of claim 9 further comprising replaying an entire history of the logless components without logging.

14. The method of claim 9 further comprising exploiting logging performed at the remote front end client device and the back end device, by the logless components, a replay of the logless components is performed without a log in the middle tier device.

15. The method of claim 9 further comprising reaching a stateless form for the logless components at an end of a lifetime associated therewith.

16. The method of claim 9 further comprising enforcing "exactly once" execution semantics.

17. The method of claim 9 further comprising establishing an execution order and a deterministic play for the execution order.

* * * * *